United States Patent
Liu et al.

(10) Patent No.: US 11,240,499 B2
(45) Date of Patent: Feb. 1, 2022

(54) METHOD AND APPARATUS FOR VIDEO CODING

(71) Applicant: Tencent America LLC, Palo Alto, CA (US)

(72) Inventors: Shan Liu, San Jose, CA (US); Zhenzhong Chen, Wuhan (CN); Sijia Chen, Shenzhen (CN); Yiming Li, Wuhan (CN)

(73) Assignee: Tencent America LLC, Palo Alto, CA (US)

(*) Notice: Subject to any disclaimer, the term of this patent is extended or adjusted under 35 U.S.C. 154(b) by 0 days.

(21) Appl. No.: 16/879,445

(22) Filed: May 20, 2020

(65) Prior Publication Data

US 2020/0374520 A1 Nov. 26, 2020

Related U.S. Application Data

(60) Provisional application No. 62/852,853, filed on May 24, 2019, provisional application No. 62/857,162, filed on Jun. 4, 2019.

(51) Int. Cl.
| | |
|---|---|
| *H04N 19/119* | (2014.01) |
| *H04N 19/192* | (2014.01) |
| *H04N 19/169* | (2014.01) |
| *H04N 19/70* | (2014.01) |
| *H04N 19/96* | (2014.01) |

(52) U.S. Cl.
CPC ....... *H04N 19/119* (2014.11); *H04N 19/1883* (2014.11); *H04N 19/192* (2014.11); *H04N 19/70* (2014.11); *H04N 19/96* (2014.11)

(58) Field of Classification Search
CPC .... H04N 19/119; H04N 19/147; H04N 19/96; H04N 19/70; H04N 19/192; H04N 19/1883; H04N 19/174
See application file for complete search history.

(56) References Cited

U.S. PATENT DOCUMENTS

| | | | |
|---|---|---|---|
| 2013/0039422 A1* | 2/2013 | Kirchhoffer | H04N 19/119 |
| | | | 375/240.13 |
| 2017/0150186 A1* | 5/2017 | Zhang | H04N 19/625 |
| 2018/0270500 A1* | 9/2018 | Li | H04N 19/54 |
| 2018/0302638 A1* | 10/2018 | Seo | H04N 19/174 |
| 2020/0077099 A1* | 3/2020 | Ikai | H04N 19/157 |

(Continued)

*Primary Examiner* — Neil R Mikeska
(74) *Attorney, Agent, or Firm* — Oblon, McClelland, Maier & Neustadt, L.L.P.

(57) ABSTRACT

An apparatus for video decoding includes receiving and processing circuitry. The circuitry is configured to receive a bitstream including a syntax element associated with a parent coding unit (CU) in a picture indicating the parent CU is partitioned into a predefined set of child CUs without performing a recursive tree-structure-based partitioning, and process the child CUs according to the indication of the syntax element to reconstruct the picture. In an embodiment, at least two subdivisions need to be performed when the parent CU is partitioned using the recursive tree-structure-based partitioning in order to obtain the same set of child CUs. In an embodiment, at least one of the child CUs has a size larger than a minimum allowed CU size for partitioning the parent CU and includes no syntax element to indicate whether the at least one of the child CUs is to be further subdivided.

20 Claims, 15 Drawing Sheets

(56) References Cited

U.S. PATENT DOCUMENTS

| | | | |
|---|---|---|---|
| 2020/0137422 A1* | 4/2020 | Misra | H04N 19/132 |
| 2020/0236362 A1* | 7/2020 | Lee | H04N 19/521 |
| 2020/0413102 A1* | 12/2020 | Hsiang | H04N 19/176 |
| 2021/0006799 A1* | 1/2021 | Lee | H04N 19/593 |
| 2021/0092394 A1* | 3/2021 | Tsai | H04N 19/159 |

* cited by examiner

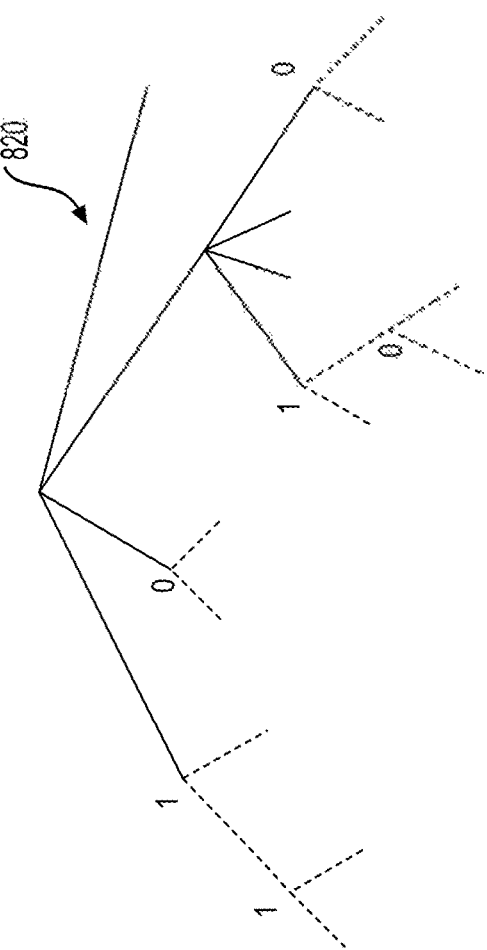
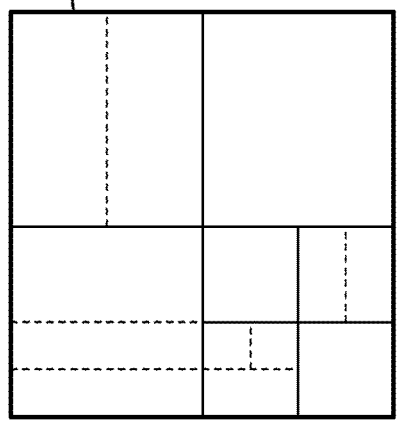
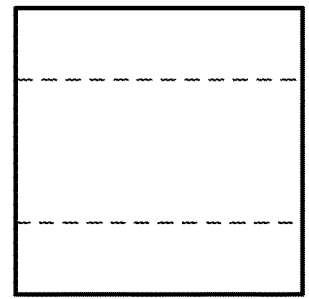
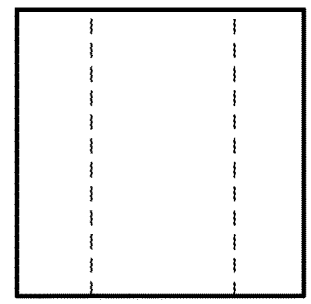
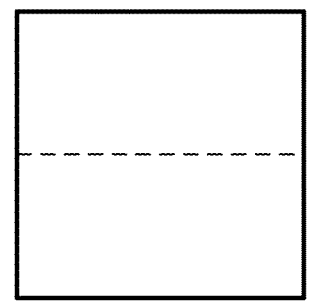
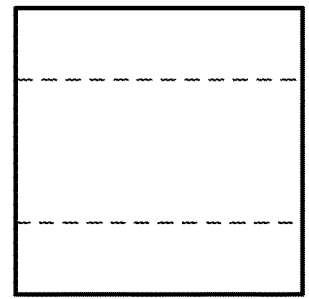
FIG. 8A
FIG. 8B
FIG. 9A
FIG. 9B
FIG. 9C
FIG. 9D

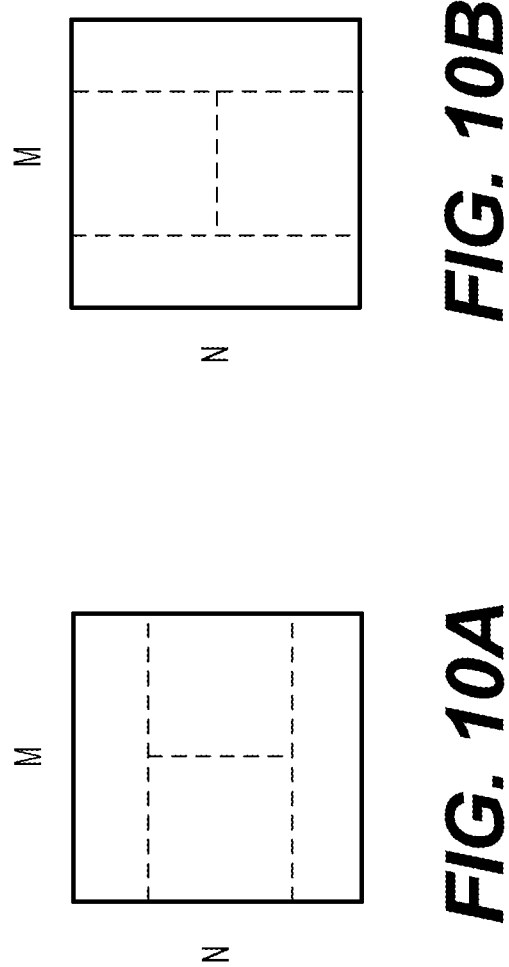

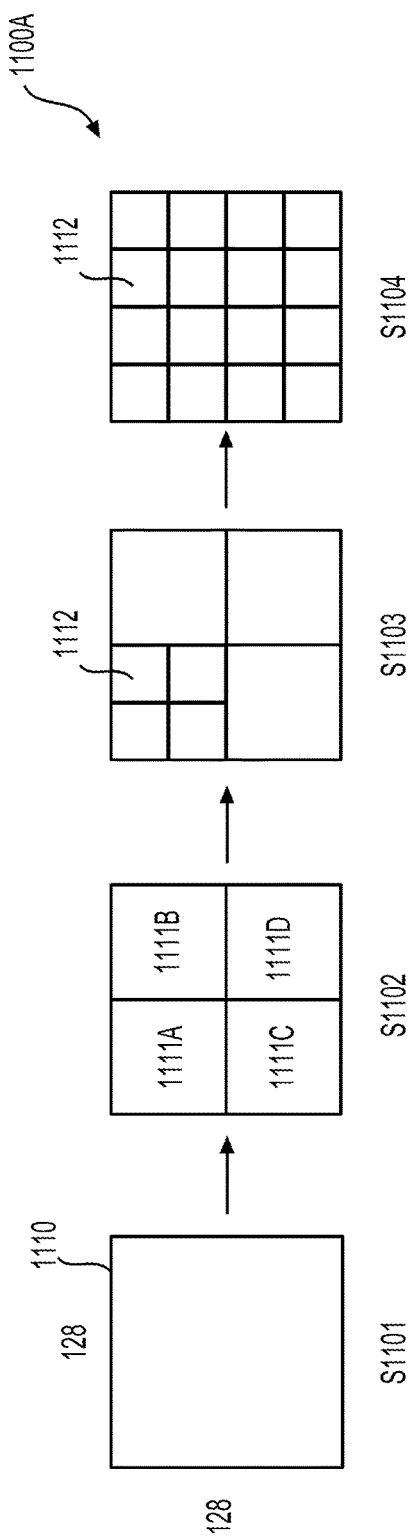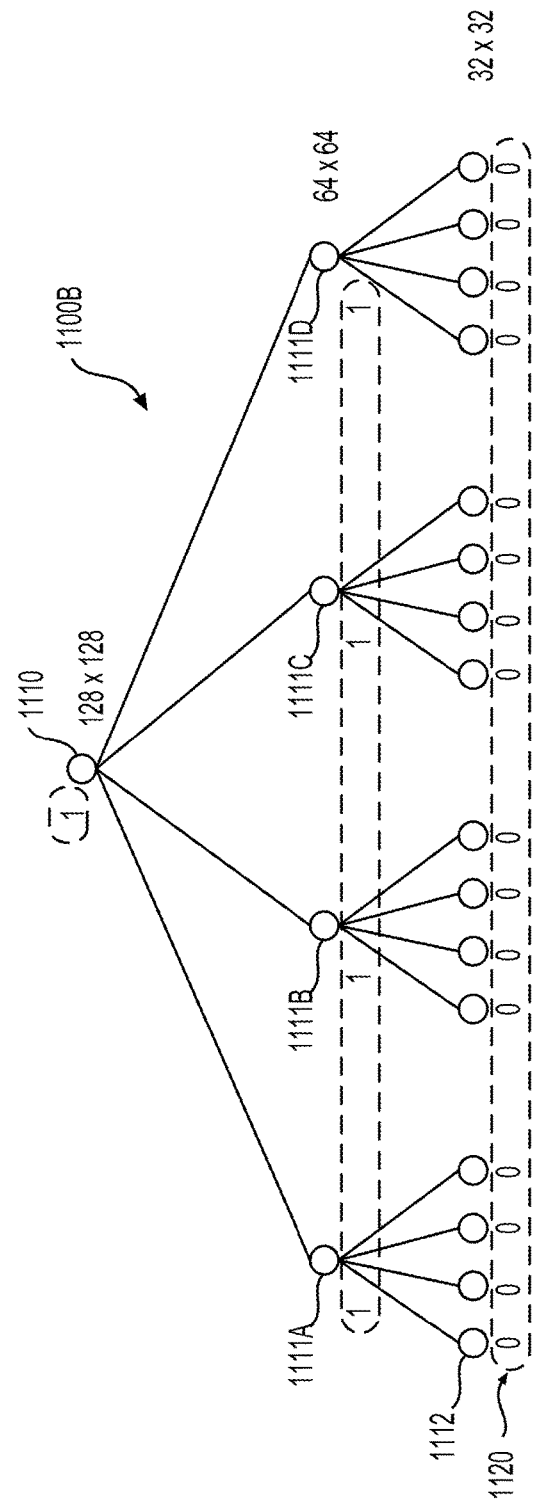

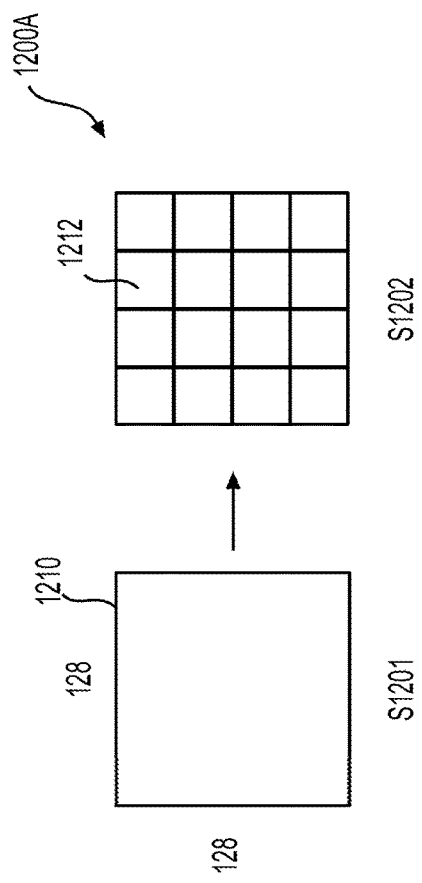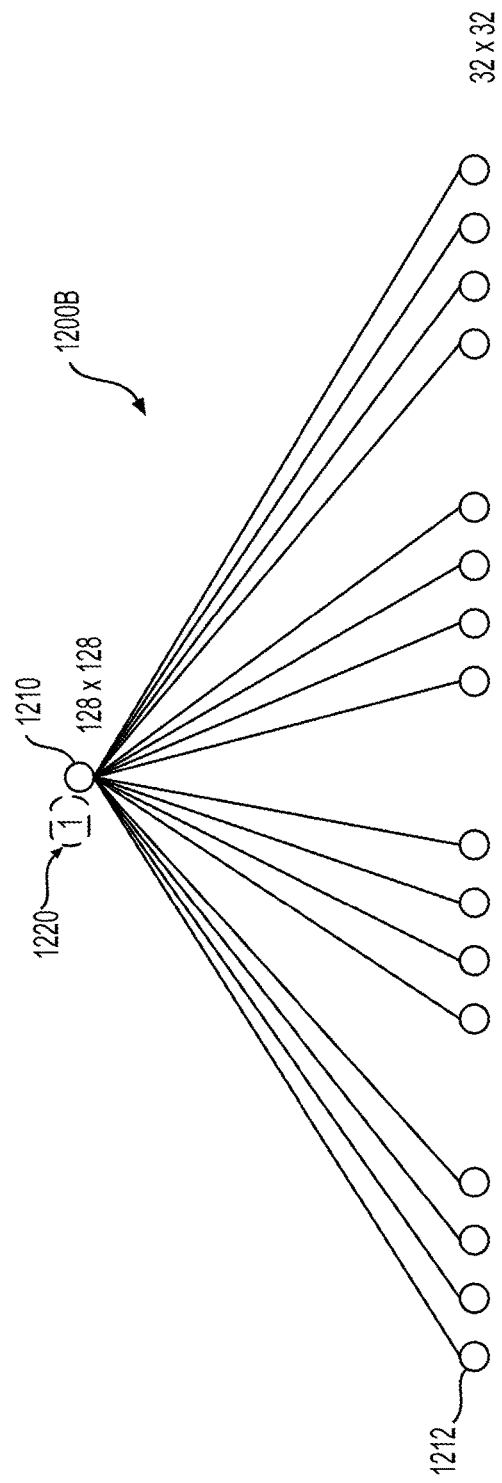
FIG. 12A
FIG. 12B

METHOD AND APPARATUS FOR VIDEO CODING

INCORPORATION BY REFERENCE

This present disclosure claims the benefit of U.S. Provisional Application No. 62/852,853, "A Kind of Split Mode for Further Video Coding" filed on May 24, 2019, and No. 62/857,162, "A Kind of Split Mode for Further Video Coding" filed on Jun. 4, 2019, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions.

As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding or decoding. In some examples, an apparatus for video decoding includes receiving and processing circuitry. The circuitry is configured to receive a bitstream including a syntax element associated with a parent coding unit (CU) in a picture indicating the parent CU is partitioned into a predefined set of child CUs without performing a recursive tree-structure-based partitioning, and process the child CUs according to the indication of the syntax element to reconstruct the picture. In an embodiment, at least two subdivisions need to be performed when the parent CU is partitioned using the recursive tree-structure-based partitioning in order to obtain the same set of child CUs.

In an embodiment, at least one of the child CUs has a size larger than a minimum allowed CU size for partitioning the parent CU and includes no syntax element to indicate whether the at least one of the child CUs is to be further subdivided. In an embodiment, the recursive tree-structure-based partitioning is a recursive partitioning based on a binary tee structure, a ternary tree structure, a quadtree structure, an extended quadtree structure, or a combination of two or more of the binary tee structure, the ternary tree structure, the quadtree structure, or the extended quadtree structure.

In an embodiment, the parent CU is a coding tree unit (CTU) partitioned from the picture, or is partitioned from a CTU that is partitioned from the picture. In an embodiment, the child CUs are CUs that are not further subdivided. For example, no syntax element associated with each of the child CUs is transmitted in the bitstream for indicating whether each of the child CUs is further subdivided. In an embodiment, at least one of the child CUs is associated with a syntax element indicating whether the at least one of the child CUs is further subdivided.

In an embodiment, the child CUs have a same shape and size. In an embodiment, the child CUs have a square shape or a rectangular shape. In an embodiment, the child CUs have a size of 8×8 samples. In an embodiment, the child CUs have different shapes or sizes. In an embodiment, the syntax element indicates a template describing how the parent CU is partitioned into the predefined set of child CUs.

In some examples, an apparatus for video encoding includes processing and transmitting circuitry. The circuitry is configured to partition a parent CU in a picture into a predefined set of child CUs without performing a recursive tree-structure-based partitioning, and process the child CUs to generate a bitstream including a syntax element associated with the parent CU that indicates the parent CU is partitioned into the set of child CUs without performing the recursive tree-structure-based partitioning.

Aspects of the disclosure also provide non-transitory computer-readable media storing instructions which when executed by a computer for video decoding cause the computer to perform the methods for video encoding or decoding.

BRIEF DESCRIPTION OF THE DRAWINGS

Further features, the nature, and various advantages of the disclosed subject matter will be more apparent from the following detailed description and the accompanying drawings in which:

FIG. 8A shows a coding tree unit (CTU) that is partitioned with a quadtree plus binary tree (QTBT) structure (820).

FIG. 8B shows the QTBT structure (820).

FIG. 9A shows a horizontal binary tree.

FIG. 9B shows a vertical binary tree.

FIG. 9C shows a horizontal center-side ternary-tree.

FIG. 9D shows a vertical center-side ternary-tree.

FIG. 10A shows a parent coding unit (CU) split into two M×(N/4) CUs and two (M/2)×(N/2) CUs.

FIG. 10B shows a parent CU split into two (M/4)×N CUs and two (M/2)×(N/2) CUs.

FIG. 11A shows a tree-structure based block partitioning process (1100A) according to an embodiment of the disclosure.

FIG. 11B shows a coding tree (1100B) corresponding to the partitioning process (1100A).

FIG. 12A shows a direct split mode based block partitioning process (1200A) according to an embodiment of the disclosure.

FIG. 12B shows another coding tree (1200B) corresponding to the partitioning process (1200A).

DETAILED DESCRIPTION OF EMBODIMENTS

I. Video Coding Encoder and Decoder

Figure 1:
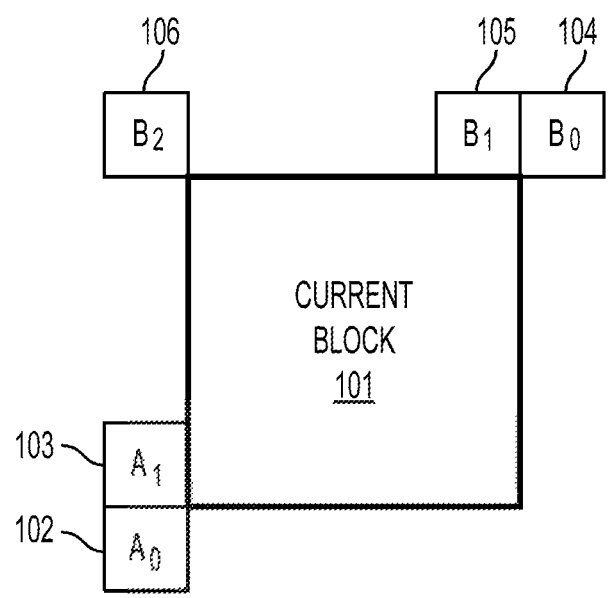
FIG. 1 is a schematic illustration of a current block and its surrounding spatial merge candidates in one example.
Figure 2:
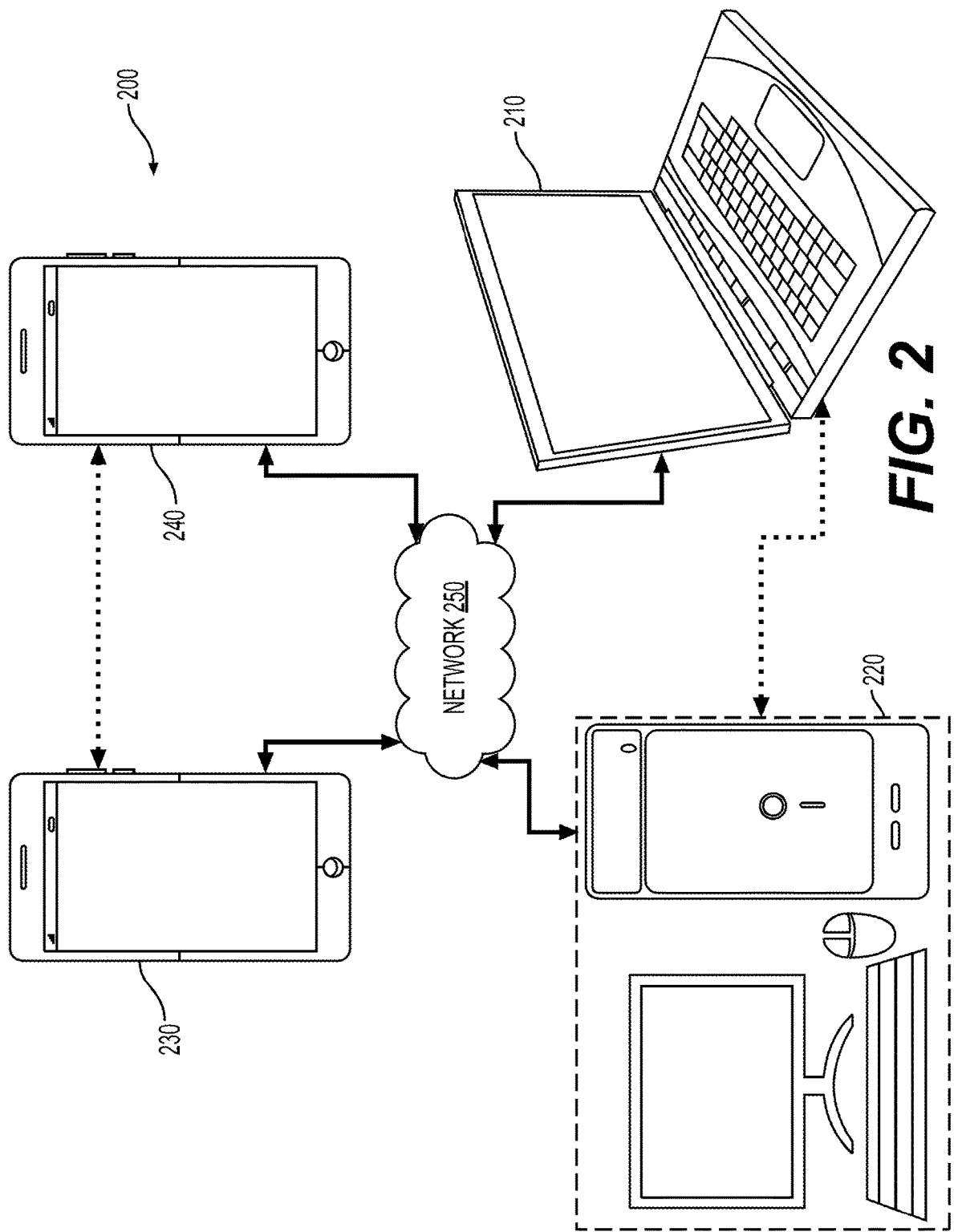
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the tetminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
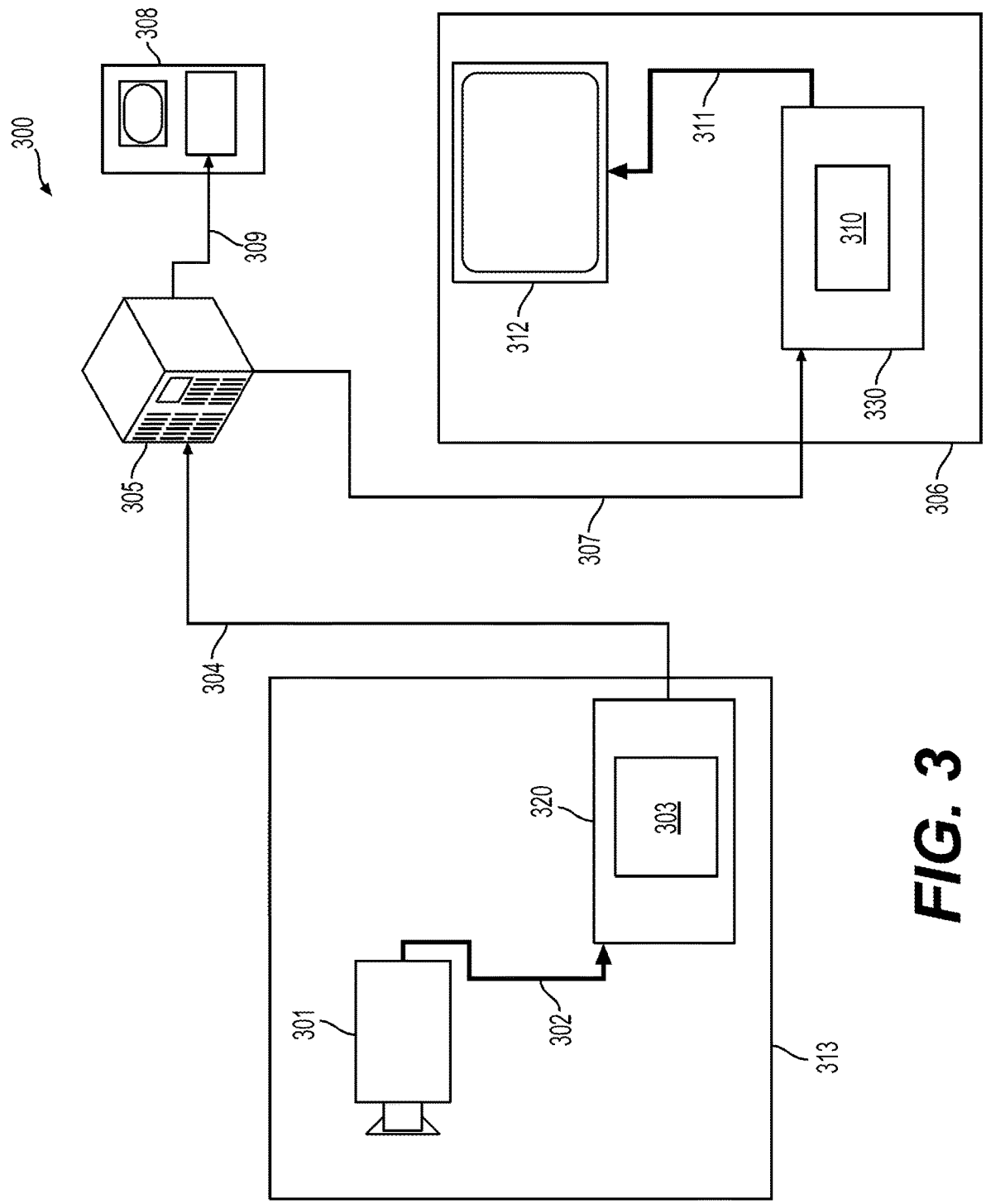
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
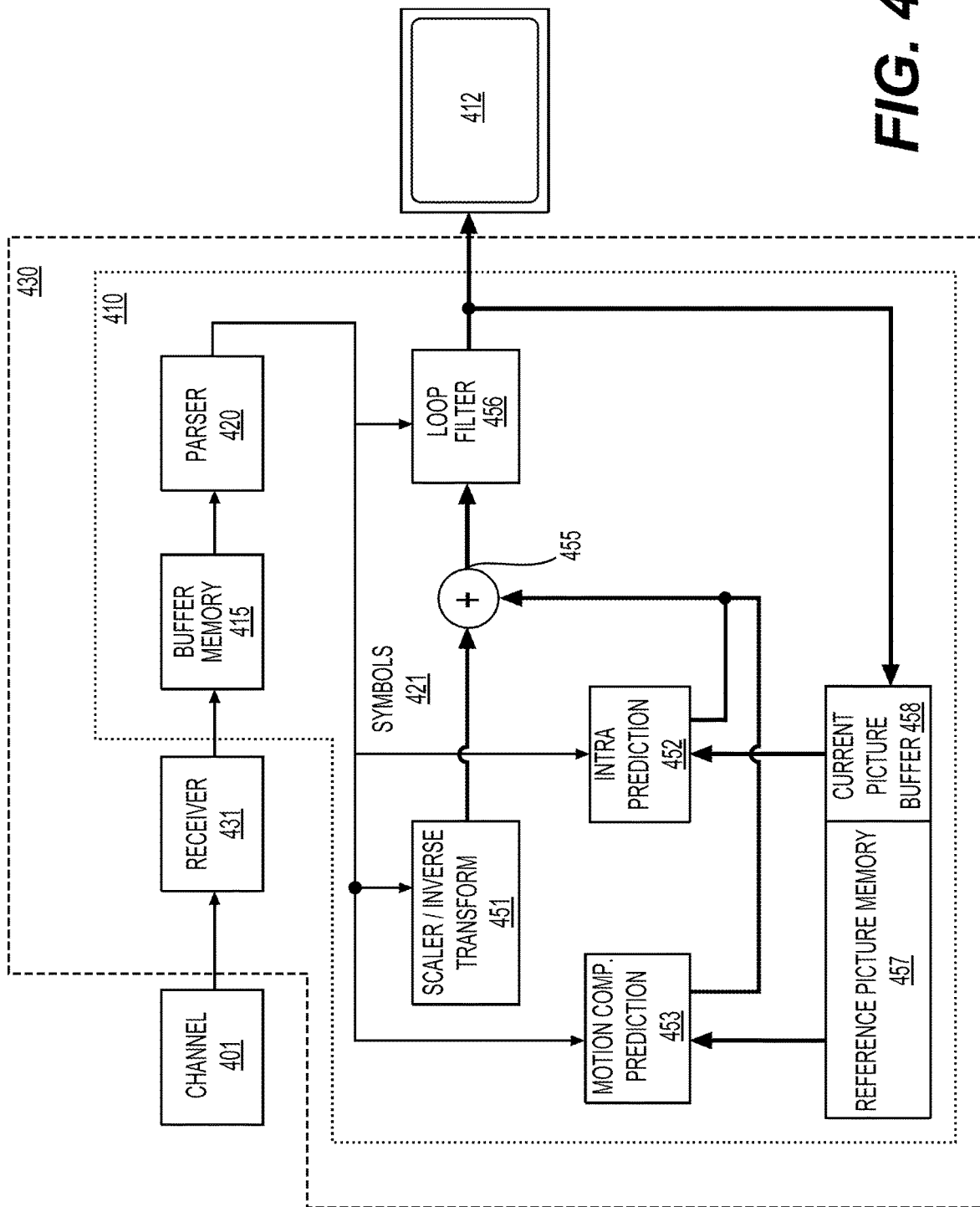
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compress technology or standard. Specifically a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
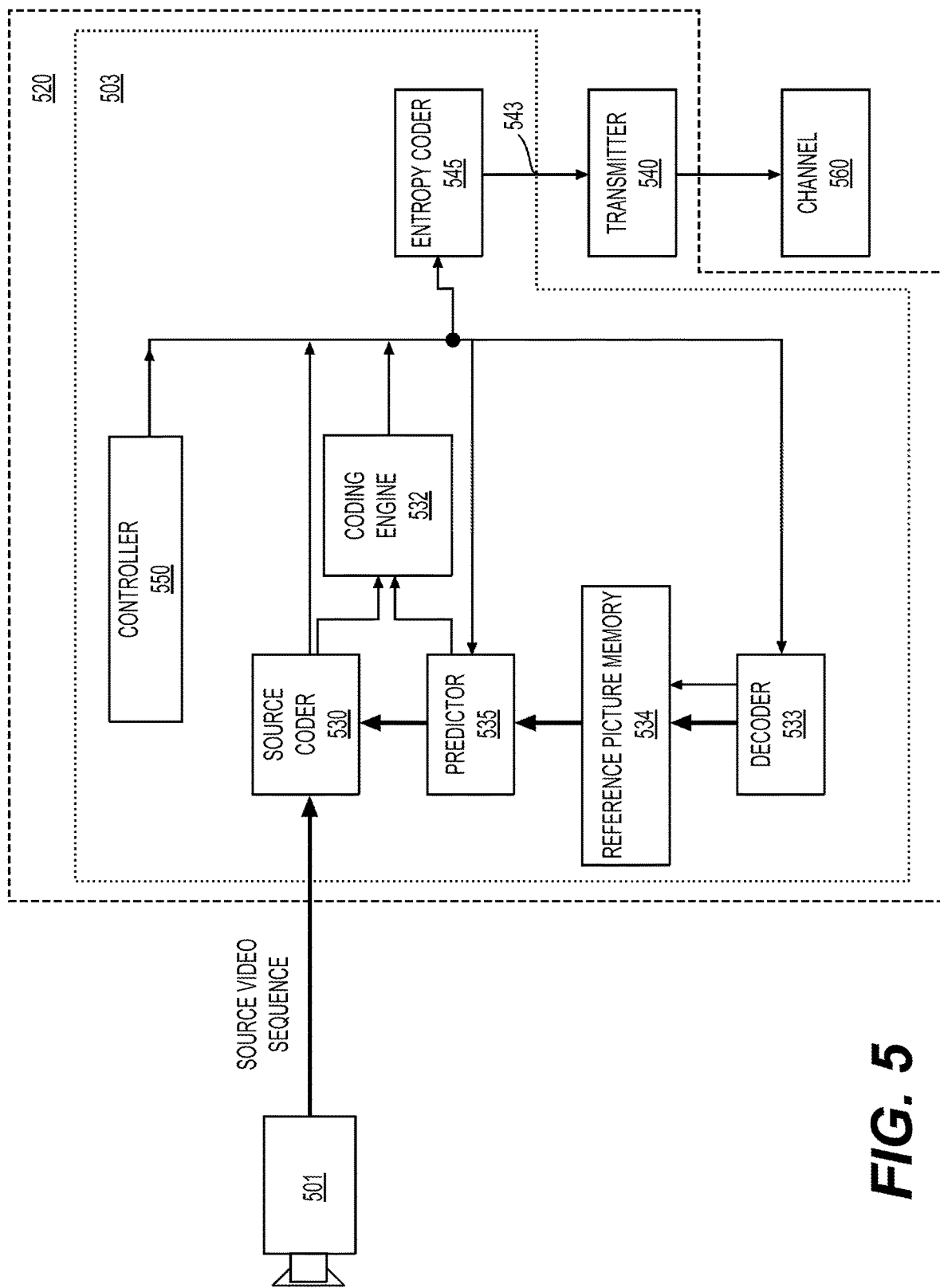
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
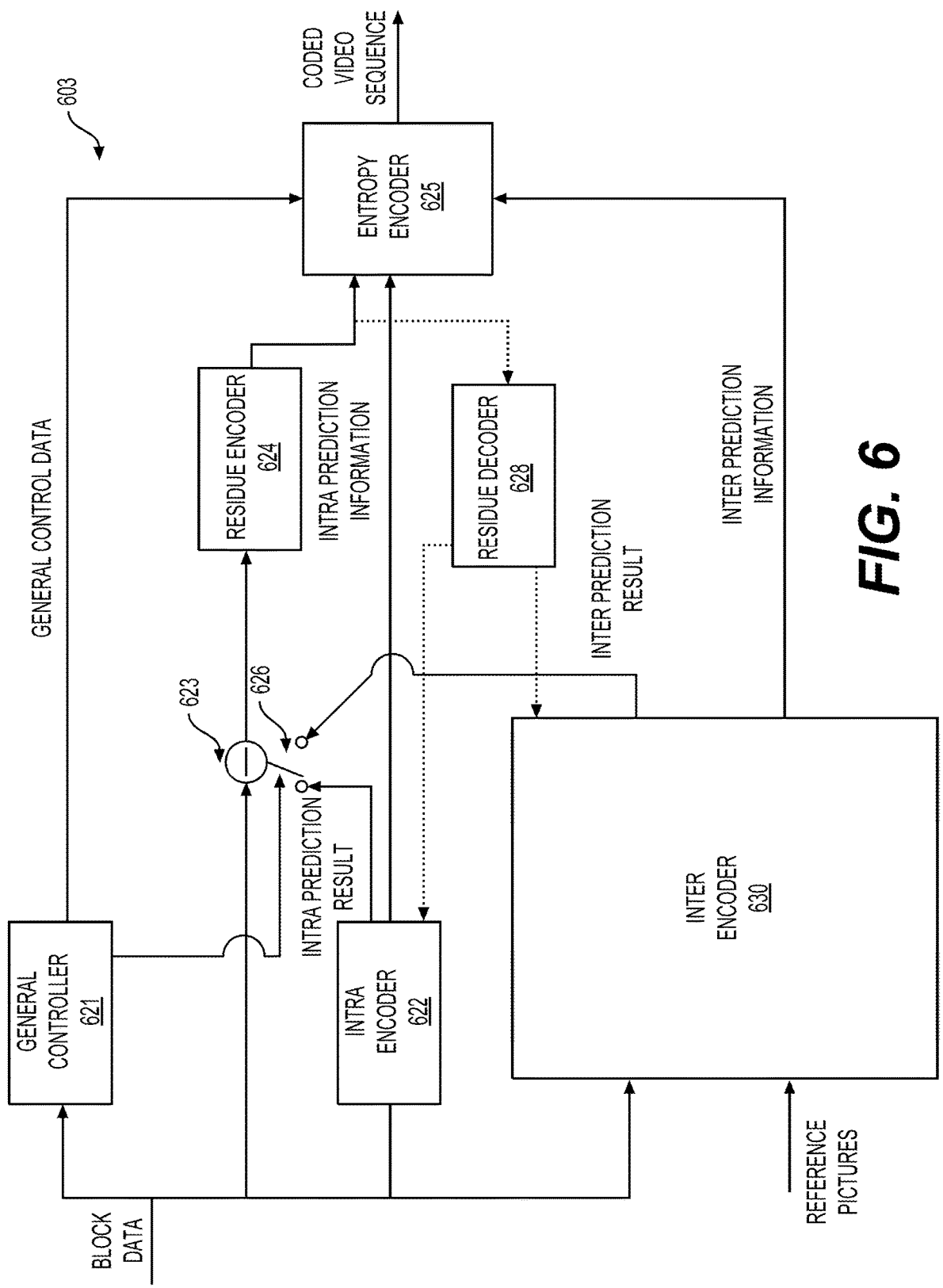
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use a inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra predicton information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
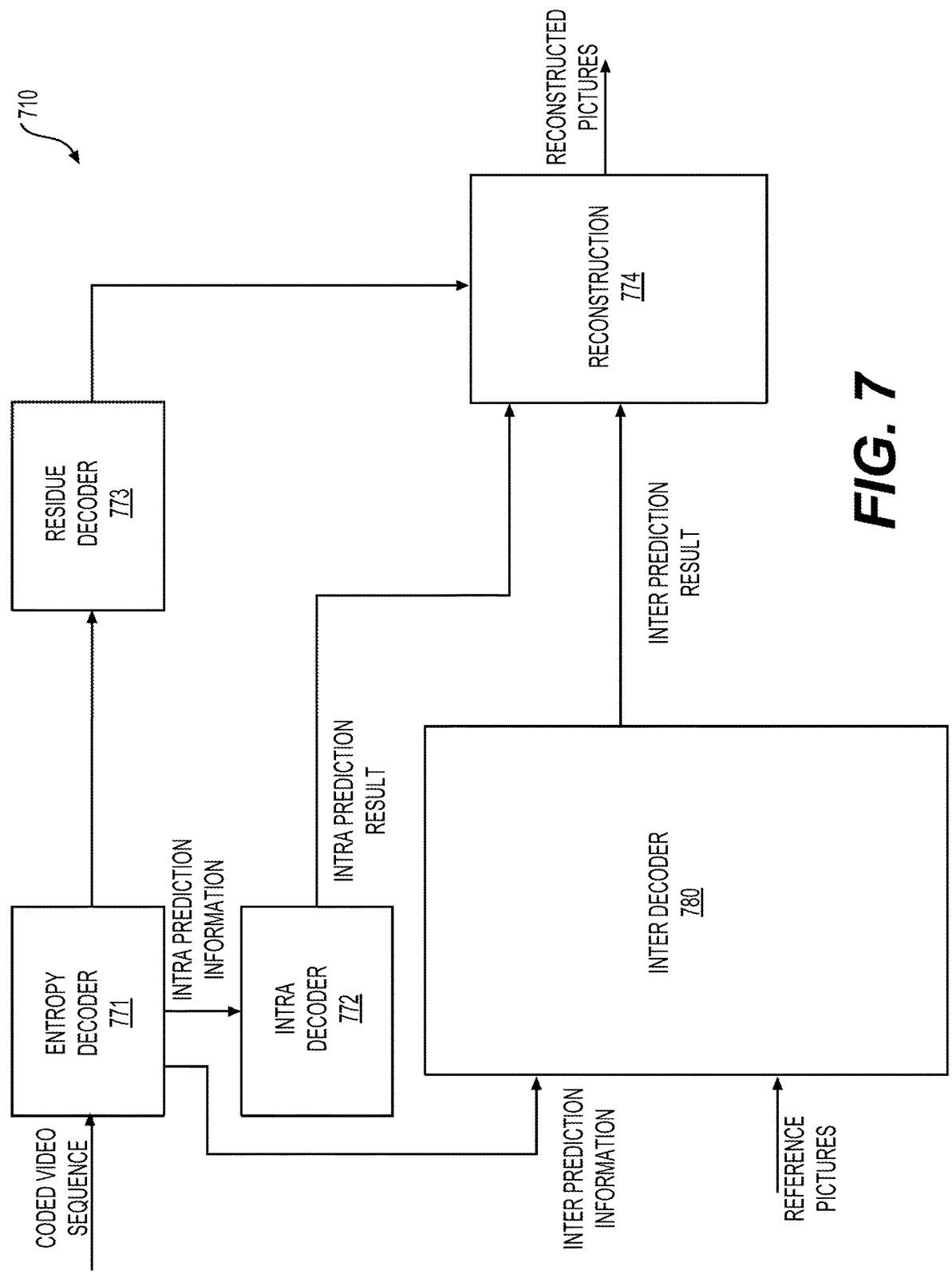
FIG. 7 shows a block diagram of a decoder in accordance with another embodiment.

FIG. 7 shows a diagram of video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Block Partitioning Structures

1. Quadtree Block Partitioning Structure

A block partitioning structure can be employed to produce a coding tree that includes a root node, non-leaf nodes, and leaf nodes. In some embodiments, by using a quadtree structure, a coding tree unit (CTU) can be split into coding units (CUs) (leaf node CUs or leaf CUs in a coding tree) to adapt to various local characteristics. For example, the CTU can be partitioned into intermediate CUs (non-leaf node CUs or non-leaf CUs) with a quadtree split. An intermediate CU can be further partitioned in a recursive way using the quadtree structure with a restriction of an allowable CU size.

In this disclosure, during a process where a CTU is partitioned into CUs based as indicated by a coding tree, a CU refers to a leaf node CU in a coding tree, while an intermediate CU (between the CTU and the CUs in the coding tree) refers to a non-leaf node CU in the coding tree.

A decision on whether to code a picture area using an inter-picture (temporal) or intra-picture (spatial) prediction is made at the leaf CU level. For a leaf CU to-be-coded with inter prediction, the leaf CU can be further split, for example, into one, two, or four prediction units (PUs) according to a PU splitting type. Inside one PU, a same prediction process is applied and relevant information is transmitted to a decoder on a PU basis. Similarly, for a leaf CU to-be-coded with intra prediction, the leaf CU can be further partitioned for applying different intra coding modes.

After obtaining a residual block of a leaf CU by applying a prediction process, the leaf CU can be partitioned into transform units (TUs) according to another quadtree structure. As can be seen, there are multiple partition conceptions including CU (leaf node CU), PU, and TU. In some embodiments, a CU or a TU can only be square shape, while a PU may be square or rectangular shape. In some embodiments, one coding block corresponding to a leaf CU may further split into four square sub-blocks, and transform is performed on each sub-block, i.e., TU. One coding block corresponding to a leaf CU can be split recursively into smaller TUs using a quadtree structure which is called residual quadtree (RQT).

At a picture boundary, in some embodiments, implicit quadtree split can be employed so that a block will keep quad-tree splitting until the size fits the picture boundary.

2. Quadtree Plus Binary Tree (QTBT) Block Partitioning Structure

In some embodiments, a quadtree plus binary tree (QTBT) structure is employed. The QTBT structure removes the concepts of multiple partition types (the CU, PU and TU concepts), and supports more flexibility for leaf CU partition shapes. In the QTBT block structure, a (leaf) CU can have either a square or rectangular shape.

FIG. 8A shows a CTU (810) that is partitioned by using a QTBT structure (820) shown in FIG. 8B. The CTU (810) is first partitioned by a quadtree structure. The resulting quadtree nodes are further partitioned by a binary tree structure or a quadtree structure. The quadtree splitting is represented as solid lines, while the binary tree splitting is represented by dashed lines. There can be two splitting types, symmetric horizontal splitting and symmetric vertical splitting, in the binary tree splitting. The binary tree leaf nodes CUs can be used for prediction and transform processing without any further partitioning (e.g., no PUs in the leaf CUs). Accordingly, CU, PU and TU can have the same block size in the QTBT coding block structure in the example of FIG. 8A and FIG. 8B.

In some embodiments, a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT partitioning scheme in some embodiments:
CTU size: the root node size of a quadtree.
MinQTSize: the minimum allowed quadtree leaf node size.
MaxBTSize: the maximum allowed binary tree root node size.
MaxBTDepth: the maximum allowed binary tree depth.
MinBTSize: the minimum allowed binary tree leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0.

When the binary tree depth reaches MaxBTDepth (i.e., 4), no further splitting is considered. When the binary tree node has a width equal to MinBTSize (i.e., 4), no further horizontal splitting is considered. Similarly, when the binary tree node has a height equal to MinBTSize, no further vertical splitting is considered. The leaf nodes of the binary tree are further processed by prediction and transform processing without any further partitioning (e.g., no PU partition). In an embodiment, a maximum CTU size is 256×256 luma samples.

In each splitting (i.e., non-leaf) node of the binary tree, one flag can be signaled to indicate which splitting type (i.e., horizontal or vertical) is used. For example, 0 indicates a horizontal splitting and 1 indicates a vertical splitting. For the quadtree splitting, there is no need to indicate the splitting type since quadtree splitting can split a block both horizontally and vertically to produce 4 sub-blocks with an equal size.

In some embodiments, the QTBT scheme supports the flexibility for the luma and chroma to have a separate QTBT structure. For example, for P and B slices, the luma and chroma blocks in one CTU share the sane QTBT structure. However, for I slices, the luma CTB is partitioned into CUs by a QTBT structure, and the chroma blocks are partitioned into chroma CUs by another QTBT structure. Thus, a CU in an I slice consists of a coding block of the luma component or coding blocks of two chroma components, and a CU in a P or B slice consists of coding blocks of all three color components.

In some embodiments, inter prediction for small blocks is restricted to reduce memory access of motion compensation. For example, bi-prediction is not supported for 4×8 and 8×4 blocks, and inter prediction is not supported for 4×4 blocks.

3. Ternary Tree (TT) Block Partitioning Structure

In some embodiments, a multi-type-tree (MTT) structure is used for partitioning a picture. The MTT structure is a more flexible tree structure than the QTBT structure. In MTT, in addition to quad-tree and binary-tree (horizontal or vertical), horizontal center-side ternary-tree and vertical center-side ternary-tree as shown in FIG. 9C and FIG. 9D, respectively, are employed. Ternary tree partitioning can complement quad-tree and binary-tree partitioning. For example, ternary-tree partitioning is able to capture objects which locate in a block center, while quad-tree and binary-tree splits crossing block centers. In an example, the width and height of partitions by ternary trees are a power of 2 so that no additional transform partition is needed.

For example, when the MTT structure is employed, a CTU can first be split into four CUs by a quadtree structure. Then, each CU can be further partitioned recursively by a quadtree structure, a binary tree structure, or a ternary tree structure. The partitioning may be restricted with CU sizes and split types of a parent CU. There are two splitting types, symmetric horizontal splitting (FIG. 9A or FIG. 9C) and symmetric vertical splitting (FIG. 9B and FIG. 9D), in the binary tree and ternary tree splitting. Accordingly, a parent CU can be split into two, three or four sub-CUs (or child CUs). Each CU can have a square or rectangular shape.

4. Extended Quadtree Tree Block Partitioning Structure

In some embodiments, a CTU can first be split into four CUs (intermediate CUs) by a quadtree structure. After the quadtree split, each CU (intermediate CU) can be further partitioned recursively by a quadtree structure, a binary structure, or an extended quadtree (EQT) structure witn the restrictions of a CU size and a split type of a parent CU. EQT partitioning indicates a parent CU can be split into four CUs with different sizes. For example, a parent CU with a size of N by M samples can be split into two M×(N/4) CUs and two (M/2)×(N/2) CUs, or two (M/4)×N CUs and two (M/2)×(N/2) CUs as shown in FIG. 10A and FIG. 10B, respectively. There can be two splitting types, symmetric horizontal splitting and symmetric vertical splitting, in the BT and EQT splitting. A parent CU can be split into two or four sub-CUs (or child CUs). Each CU can have either a square or rectangular shape.

III. Direct Split Mode

In some embodiments, a direct split mode is employed for partitioning a parent CU into child CUs. As described, in tree-structure based block partitioning modes (e.g., block partitioning modes with a tree structure of QT, BT, TT, EQT, or a combination thereof), a CTU can be partitioned into CUs (leaf CUs) by recursively applying partitioning of a tree structure. In contrast, in direct split mode, a parent CU (e.g., a CTU or an intermediate CU) can be directly partitioned into a predefined set of child CUs (e.g., intermediate CUs or leaf CUs) without going through the recursive partitioning process. One advantage of the direct split mode is that signaling cost for describing how leaf CUs are partitioned from a CTU can be reduced.

FIG. 11A shows a tree-structure based block partitioning process (1100A) according to an embodiment of the disclosure. The partitioning process (1100A) is based on a quadtree structure, and includes steps from (S1101) to (S1104). As a result of the partitioning process (1100A), a parent CU (1110) is partitioned into 16 child CUs (1112).

At (S1101), the parent CU (1110) is provided. The parent CU (1110) can be a CTU partitioned from a picture, or an intermediate CU (non-leaf CU in a coding tree) partitioned from a CTU. The CTU can be part of a slice or tile partitioned from the picture. The parent CU (1110) can include a coding block (CB) of luma samples and two coding blocks (CBs) of chroma samples in some example. For example, the parent CU (1110) can have a square shape, and have a size of 256, 128, 64, or 32 samples. The parent CU (1110) in FIG. 11A is shown to have a size of 128×128 samples.

At (S1102), the parent CU (1110) is subdivided into 4 sub-CUs (1111A-1111D) each having a size of 64×64 samples. At (S1103), the top-left sub-CU (1111A) is further subdivided into 4 child CUs 1112 each having a size of 32×32 samples. At (S1104), the remaining sub-CUs (1111B-1111D) are each further partitioned into 4 child CUs (1112). In total, five partitions of the quadtree structure are performed in the process (1100A).

FIG. 11B shows a coding tree (1100B) corresponding to the partitioning process (1100A). Each node in the coding tree (1100B) corresponds to one of the parent CU (1110), the sub-CUs (1111A-1111D), or the child CUs (1112). Thus, identical numerals are assigned to the respective nodes in FIG. 11B as used in FIG. 11A.

When the partitioning process (1100A) is employed in an encoder, syntax elements indicating partitioning of the parent CU (1110) can be signaled in a bitstream generated from the encoder. In an example, at the parent CU (1110) level, a flag can be include into the bitstream to indicate whether the parent CU (1110) forms a CU (leaf CU) or whether the parent CU (1110) is split into four equally-sized blocks (the sub-CUs (1111A-1111D)) corresponding to square luma sample blocks. When the parent CU (1110) is split, for each of the resulting sub-CUs (1111A-1111D), another flag can be transmitted specifying whether the sub-CU (1111A-1111D) represents a CU (leaf CU) or whether the sub-CU (1111A-1111D) is further split into four equally-sized blocks. This recursive subdivision can be continued until none of the resulting blocks is further divided.

When the above partitioning signaling method is employed, as shown FIG. 11B, corresponding to each of the nodes (1110, 1111A-1111D, and 1112), a flag (1120) indicating whether the respective node is to-be-partitioned is generated and transmitted in the bitstream. For example, the flag of bit 1 can indicate a further partition, while the flag of bit 0 can indicate no further partition to be performed. In total, 21 flags (1120) or bits can be transmitted for signaling the partitioning of the parent CU (1110) into the 16 child CUs (1112).

In an example, a minimum size of CUs (leaf CUs) can be signaled in a sequence parameter set (SPS) in the bitstream carrying the child CUs (1112). For example, the minimum size of CUs can range from 8×8 lama samples to a size of a CTU. When the minimum CU size is reached in the partitioning process 1100A, no splitting flags are transmitted for the corresponding blocks. Instead, it is inferred that these blocks with the minimum CU size are not further split. In the FIG. 11B example, if the minimum CU size is defined to be 32×32 samples, no split flags are transmitted for each child CU (1112). In such a scenario, 5 flags (1120) in total (fewer fits) can be transmitted for signaling how the parent CU (1110) is partitioned.

FIG. 12A shows a direct split mode based block partitioning process (1200A) according to an embodiment of the disclosure. The partitioning process (1200A) can be performed without using tree-structure based partitioning. The process can include steps from (S1201) to (S1202). As a result of the portioning process (1200A), a parent CU (1210) identical to the parent CU (1110) is partitioned into 16 child CUs (1212) identical to the child CUs (1112).

At (S1201), the parent CU (1210) is provided. The parent CU (1210) can be a CTU partitioned from a picture, or an intermediate CU partitioned from a CTU. The parent CU (1210) can include a CB of luma samples and two CBs of chroma samples. For example, the parent CU (1210) can have a square shape, and have a size of 256, 128, 64, or 32 samples. The parent CU (1210) in FIG. 12A is shown to have a size of 128×128 samples.

At (S1202), the parent CU (1210) is directly subdivided into 16 child CUs (1212). In total only one partition is conducted compared with 5 partitions in the FIG. 11A example.

FIG. 12B shows another coding tree (1200B) corresponding to the partitioning process (1200A). A root node (1210) corresponds to the parent CU 1210 in FIG. 12A, and 16 leaf nodes (1212) correspond to the 16 child CUs (1212) in FIG. 12A. Identical numerals are used for the respective nodes in FIG. 12B and the respective CUs in FIG. 11A.

Corresponding to the direct split mode partitioning process (1200A), syntax elements indicating partitioning of the parent CU (1210) can be signaled in a bitstream generated from an encoder. Different from the recursive partitioning in the FIG. 11A or 11B example where split flags are generated for each level of blocks in the coding tree (1100B), one split flag (1220) at the root level is generated and signaled for the direct split mode partitioning. In the FIG. 11B example, 21 flags in total (or 5 flags when the child CUs 1112 have the minimum CU size) are signaled. In contrast, only 1 flag (1220) is signaled in FIG. 12B example. Thus, signaling cost for indicating block partitioning is reduced when direct split mode is employed.

Considering there can be different predefined sets of child CUs (or different templates), a syntax element in place of the split flag (1220) may use multiple bits (more than 1 bit) to indicate which set of child CUs is indicated. In some examples, direct split mode may be combined with tree-structure-based partitioning. Thus, more bits may be used to distinguish the split mode from the tree-structure-based split modes. In some examples, configuration of whether to use direct split mode may be signaled in the respective bit stream. For example, a syntax element may be used to turn on or turn of the direct split mode. Accordingly, additional bits may be signaled for configuration purpose. However, in some examples, when the direct split mode is employed for partitioning a parent CU, the number of child CUs can be dozens of predefined target CUs. Savings of the signaling cost can still be significant in such scenarios.

Generally, a parent CU can be split into a predefined set of child CUs when direct split mode is applied. The parent CU can be a CTU or can be an intermediate CU (non-leaf CU) partitioned from a CTU. A CTU can be partitioned from a slice or a tile of a picture.

In some embodiments, the child CUs in direct split mode can be CUs (leaf CUs) for each of which an encoder determines whether inter prediction or intra prediction is to be applied. Accordingly, no split flag is signaled for the child CUs defined as CUs.

In some other embodiments, when direct split mode is used to partition a parent CU, a resulting child CU can be an intermediate CU (non-leaf CU) that can be further subdivided into CUs (leaf CUs) or smaller intermediate non-leaf CUs. In such a scenario, a split flag can be signaled for each of the child CUs to indicate whether the respective child CU is to be further split. In some examples, the child CUs can have a same size or different sizes. When a child CU has size of a minimum CU size, signaling of the respective split flag can be omitted.

In some examples, direct split mode can be used for transform block partitioning. For example, direct split mode can be used for partitioning a CU into target transform blocks. For example, partitioning based on direct split mode can replace a residual quadtree.

In some embodiments, a parent CU can be subdivided into several child CUs (or sub-CUs) with a same shape and a same size. The size and shape of the child CUs can be predefined. A syntax element indicating the predefined child CUs can be associated with the parent CU and transmitted in a bitstream. For example, to obtain several child CUs of 8×8 samples, a 32×32 parent CU can be split five times with a quadtree structure to obtain 16 child CUs. In contrast, the direct split mode supports partitioning the 32×32 CU into 8×8 child CUs directly. A syntax element can be associated with the parent CU to indicate the partitioning.

Figure 13A:
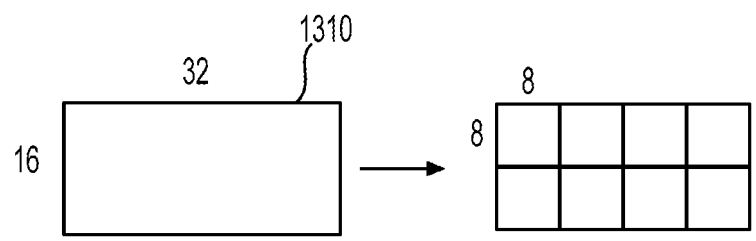
FIG. 13A shows an example where a parent CU (1310) of a size of 16×32 samples can be partitioned into 8 child CUs each having a size of 8×8 samples.
Figure 13B:
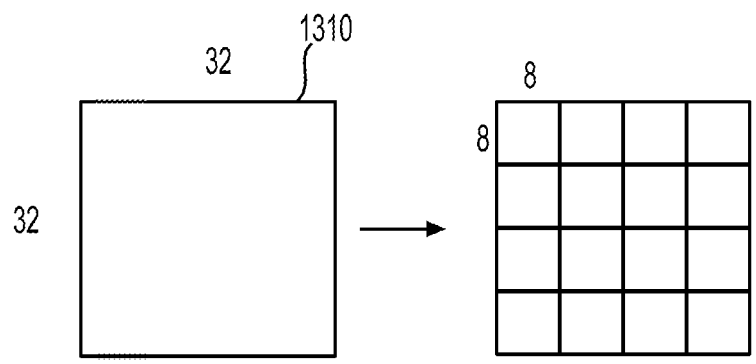
FIG. 13B shows an example where another parent CU (1320) of a size of 32×32 samples can be partitioned into 16 child CUs each having a size of 8×8 samples.

In some embodiments, corresponding to the scenario where a predefined child CU having a specific size and shape, parent CUs with different sizes can be partitioned into different number of child CUs. FIG. 13A shows an example where a parent CU (1310) of a size of 16×32 samples can be partitioned into 8 child CUs each having a size of 8×8 samples. FIG. 13B shows an example where another parent CU (1320) of a size of 32×32 samples can be partitioned into 16 child CUs each having a size of 8×8 samples.

In an embodiment, for a direct split mode, the predefined same size/shape child CUs can have a square shape. Partitioning with the direct split mode can replace a recursive partitioning process with a quadtree structure. In an example, the child CUs have a size of 8×8 samples. In an embodiment, the child CUs can have a rectangular shape. Partitioning with the direct split mode can replace a recursive partitioning process with a BT, TT, or EQT structure.

In some embodiments, a parent CU can be subdivided into several child CUs with different shapes and Sizes. For example, different templates can be defined in advance each corresponding to a different set of child CUs having various sizes and/or shapes. Each template can be indicated with a syntax element signaled in a bitstream.

In some embodiments, templates can be employed for both the cases of child CUs having a same size and shape, and child CUs having different sizes and shapes. Each such template is assigned a syntax element for signaling the particular manner of partitioning. Depending on the number of options of different templates, the bits used for indicating the direct split mode partitioning can vary.

When direct split mode is employed at an encoder side, the encoder can determine whether to use a tree-structure based partitioning mode or a direct split mode to partition a parent CU according to a rate-distortion optimization based algorithm. For example, different partitioning methods can be tested and the one with the best coding efficiency can be selected. In some embodiments, some fast algorithms can be employed to make a partitioning decision based on property of a coding area. For example, for an intra coded slice including large amount of details and textures, the slice can be partitioned into intra coded blocks with small sizes to improve codding efficiency. Accordingly, based on characteristics of the slice, a direct split mode can be selected for directly partitioning parent CUs into large number of child CUs to save signaling cost associated with block partitioning.

Figure 14A:
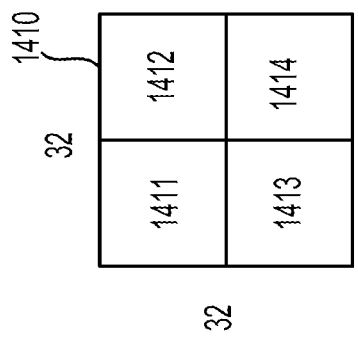
FIG. 14A shows a parent CU (1410) having a size of 32×32 samples is partitioned into the child CUs (1411-1414) having a size of 16×16 samples.
Figure 14C:
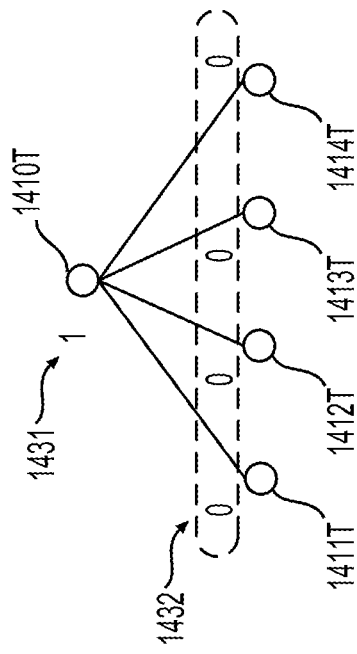
FIG. 14C shows a second coding tree corresponding to a quadtree based partitioning mode.
Figure 14B:
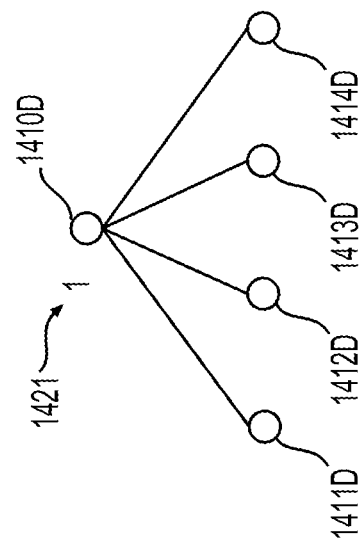
FIG. 14B shows a first coding tree corresponding to a direct split mode based partitioning.

In the examples of FIG. 12A and FIG. 12B, the parent CU (1210) is partitioned into a large number of child CUs (1212). For example, to obtain a same number of the child CUs (1212), at least two subdivisions need to be performed when the parent CU (1210) is partitioned using the recursive tree structure based partitioning. In contrast, FIGS. 14A-14C show an example where a parent CU 1410 is partitioned into 4 child CUs (1411-1414). One partition in a direct split mode based partitioning can obtain the 4 child CUs (1411-1414), while one partition in a quadtree based partitioning can also obtain the 4 child CUs. In such a scenario (small number of child CUs), employment of direct split mode can still save block partitioning related signaling cost compared with tree-structure based partitioning.

As shown in FIG. 14A, the parent CU (1410) has a size of 32×32 samples, and is partitioned into the child CUs (1411-1414) having a size of 16×16 samples. FIG. 14B shows a first coding tree corresponding to the direct split mode based partitioning. The nodes (1410D, and 1411D-1414D) correspond to the parent CU (1410) and the child CUs (1411-1414), respectively. One flag 1421 can be signaled for indicating the partitioning.

FIG. 14C shows a second coding tree corresponding to the quadtree based partitioning mode. The nodes (1410T, and 1411T-1414T) correspond to the parent CU (1410) and the child CUs (1411-1414), respectively. Five flags (1431/1432) can be signaled for indicating the partitioning (assuming the size, 16×16 sample, of the child CUs (1411T-1414T) is larger than a minimum allowed CU size). As shown, the partitioning based on the direct split mode incurs fewer bits for indicating block partitioning than that based on tree-based partitioning. If the minimum CU size is defined to be 16×16 samples, the flags (1432) can be omitted, and the partitioning in FIG. 14B and FIG. 14C would incur a same number of split flag (1 flag for each split mode).

IV. Examples of Direct Split Mode Based Block Partitioning Processes

Figure 15:
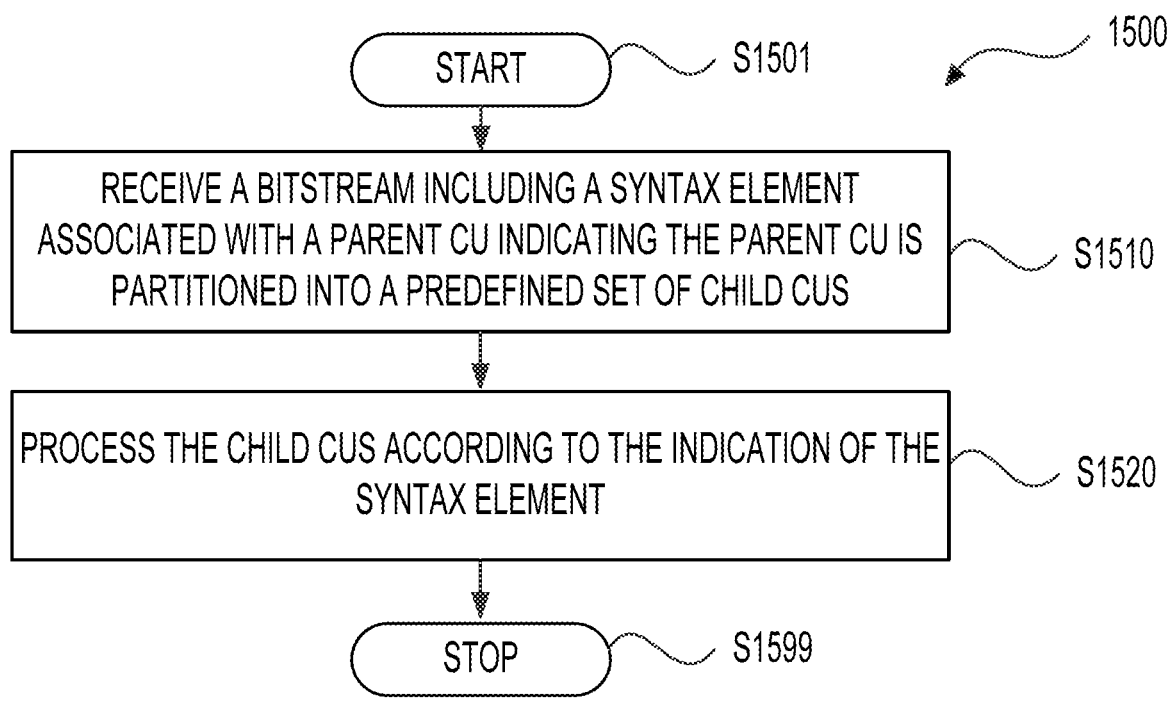
FIG. 15 shows a flow chart outlining a decoding process (1500) according to an embodiment of the disclosure.

FIG. 15 shows a flow chart outlining a decoding process (1500) according to an embodiment of the disclosure. During the process (1500), blocks of samples partitioned by a direct split mode can be processed and reconstructed. The process (1500) can be used in the reconstruction of a picture or a region of a picture. In various embodiments, the process (1500) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1500) is implemented in software instructions, thus when the processing circuitry executes the software instructions, the processing circuitry performs the process (1500). The process starts at (S1501) and proceeds to (S1510).

At S(1510), a bitstream is received that includes a syntax element associated with a parent CU in a picture. The syntax element can indicate the parent CU is partitioned into a predefined set of child CUs without performing a recursive tree-structure-based partitioning. In an example, the parent CU is partitioned into a large number of child CUs, and at least two subdivisions need to be performed if the recursive tree-structure-based partitioning is used to partition the parent CU in order to obtain the same set of child CUs.

In an example, at least one of the child CUs has a size larger than a minimum allowed CU size for partitioning the parent CU and includes no indication of whether the at least one of the child CUs is to be further subdivided. This can save signaling cost when compared with a scenario where a tree-structure-based partitioning is used and a split flag is associated with a block (larger than a minimum allowed CU size) to indicate Whether the block is to be further split.

In various examples, the recursive tree-structure-based partitioning can be a recursive partitioning based on a binary tee structure, a ternary tree structure, a quadtree structure, an extended quadtree structure, or a combination of two or more of the binary tee structure, the ternary tree structure, the quadtree structure, or the extended quadtree structure. Or, the recursive tree-structure-based partitioning can be a recursive partitioning based on a tree structure other than the tree structure listed above.

In various examples, the parent CU can be a CTU partitioned from the picture, or can be partitioned from a CTU that is partitioned from the picture. In an example, the child CUs are CUs that are not further subdivided. For example, such CUs are entities for which the encoder determines whether to apply an inter picture prediction or an intra picture prediction. Such CUs can be further divided in some examples for purpose of applying inter prediction modes or intra perdition modes.

In an example, no syntax element is transmitted for each of the child CUs in the bitstream for indicating whether each of the child CUs is further subdivided. This can save signaling cost compared with scenarios where tree-structure-based partitioning is employed, and flags indicating whether to further split are signaled.

In an example, at least one of the child CUs is associated with a syntax element indicating whether the at least one of the child CUs is further subdivided. For example, the child CUs resulting from the direct split mode can be further split, and flags are signaled to indicate further splits are to be performed or not to be performed.

In an example, the child CUs have a same shape and size. In an example, the child CUs have a square shape or a rectangular shape. In an example, the child CUs have a size of 8×8 samples. In an example, the child CUs have different shapes or sizes. In an example, the syntax element indicates a template describing how the parent CU is partitioned into the predefined set of child CUs that may have a same or different size and shape.

At (S1520), the child CUs are processed according to the indication of the syntax element to reconstruct the picture. For example, the decoder interprets the syntax element to know how the parent CU is partitioned into the child CUs, and accordingly locates and interprets syntax elements in the bitstream corresponding to the child CUs. Subsequently, based on the determined syntax elements, the decoder performs a series of decoding operations to reconstruct CUs corresponding to the child CUs. For example, the decoding operations can include inverse quantization and inverse transform for determining residual signals, determination of prediction blocks according to motion information or intra prediction mode, combination of residual signals with prediction blocks to reconstructed blocks of different color components. By reconstructing CUs in the picture, the picture can be reconstructed. The process (1500) can proceed to (S1599) and terminates at (S1599).

Figure 16:
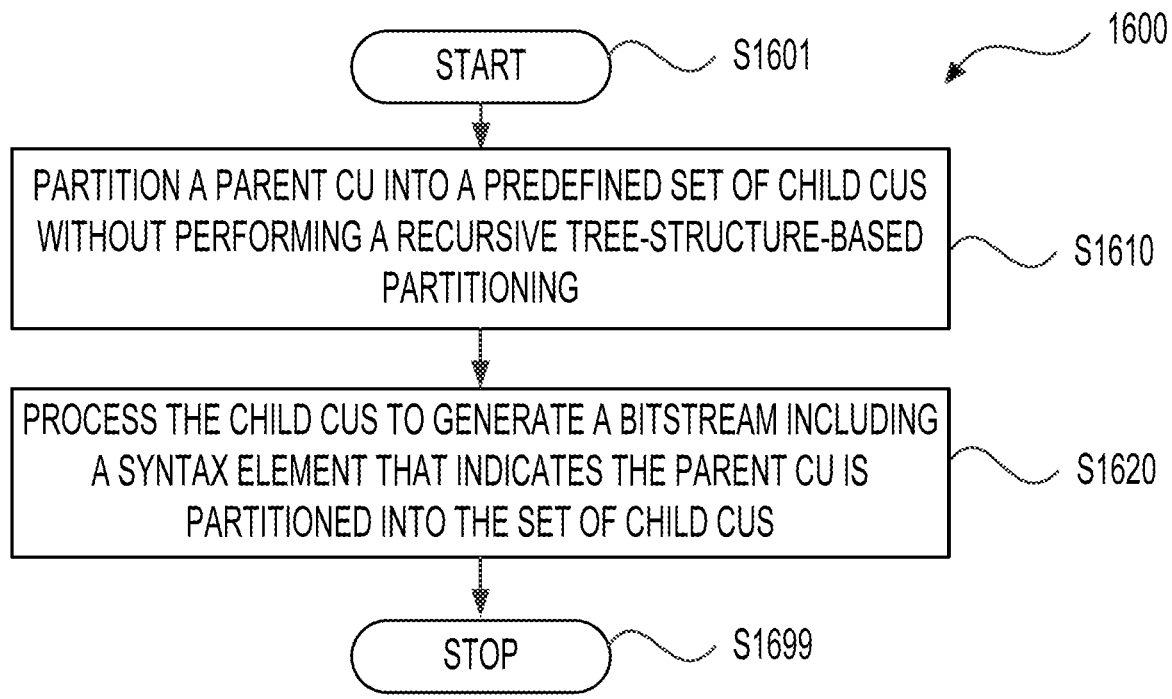
FIG. 16 shows a flow chart outlining an encoding process (1600) according to an embodiment of the disclosure.

FIG. 16 shows a flow chart outlining an encoding process (1600) according to an embodiment of the disclosure. During the process (1600), a direct split mode can be employed to partition a parent CU into a predefined set of child CUs. The process (1600) can be used in the encoding of a picture. In various embodiments, the process (1600) are executed by processing circuitry, such as the processing circuitry in the terminal devices (210), (220), (230) and (240), the processing circuitry that performs functions of the video encoder (303), the processing circuitry that performs functions of the video encoder (503), and the like. In some embodiments, the process (1600) is implemented in software instructions, thus when the processing circuitry executes the software instructions, the processing circuitry performs the process (1600). The process starts at (S1601) and proceeds to (S1610).

At (S1610), a parent CU in a picture can be partitioned into a predefined set of child CUs without performing a recursive tree-structure-based partitioning. In an example, the parent CU is partitioned into a large number of child CUs, and at least two subdivisions need to be performed if the recursive tree-structure-based partitioning is used to partition the parent CU in order to obtain the same set of child CUs.

In various examples, the recursive tree-structure-based partitioning can be a recursive partitioning based on a binary tee structure, a ternary tree structure, a quadtree structure, an extended quadtree structure, or a combination of two or more of the binary tee structure, the ternary tree structure, the quadtree structure, or the extended quadtree structure. Or, the recursive tree-structure-based partitioning can be a recursive partitioning based on a tree structure other than the tree structure listed above.

In various examples, the parent CU can be a CTU partitioned from the picture, or can be partitioned from a CTU that is partitioned from the picture. In an example, the child CUs are CUs that are not further subdivided. For example, such CUs are entities for which the encoder determines whether to apply an inter picture prediction or an intra picture prediction. Such CUs can be further divided in some examples for purpose of applying inter prediction modes or intra perdition modes.

In an example, the child CUs have a same shape and size. In an example, the child CUs have a square shape or a rectangular shape. In an example, the child CUs have a size of 8×8 samples. In an example, the child CUs have different shapes or sizes.

At (S1620), the child CUs are processed to generate a bitstream including a syntax element associated with the parent CU that indicates the parent CU is partitioned into the set of child CUs without performing the recursive tree-structure-based partitioning.

In an example, at least one of the child CUs has a size larger than a minimum allowed CU size for partitioning the parent CU and includes no syntax element to indicate whether the at least one of the child CUs is to be further subdivided. This can save signaling cost when compared with a scenario where a tree-structure-based partitioning is used and a split flag is associated with a block to indicate whether the block is to be further split.

In an example, no syntax element is transmitted for each of the child CUs in the bitstream for indicating whether each of the child CUs is further subdivided. This can save signaling cost compared with scenarios where tree-structure-based partitioning is employed, and flags indicating whether to further split are signaled.

In an example, at least one of the child CUs is associated with a syntax element indicating whether the at least one of the child CUs is further subdivided. For example, the child CUs resulting from the direct split mode can be further split and flags are signaled to indicate further splits are to be performed. In an example, the syntax element indicates a template describing how the parent CU is partitioned into the predefined set of child CUs. The process (1600) can proceed to (S1699), and terminates at (S1699).

V. Computer System

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
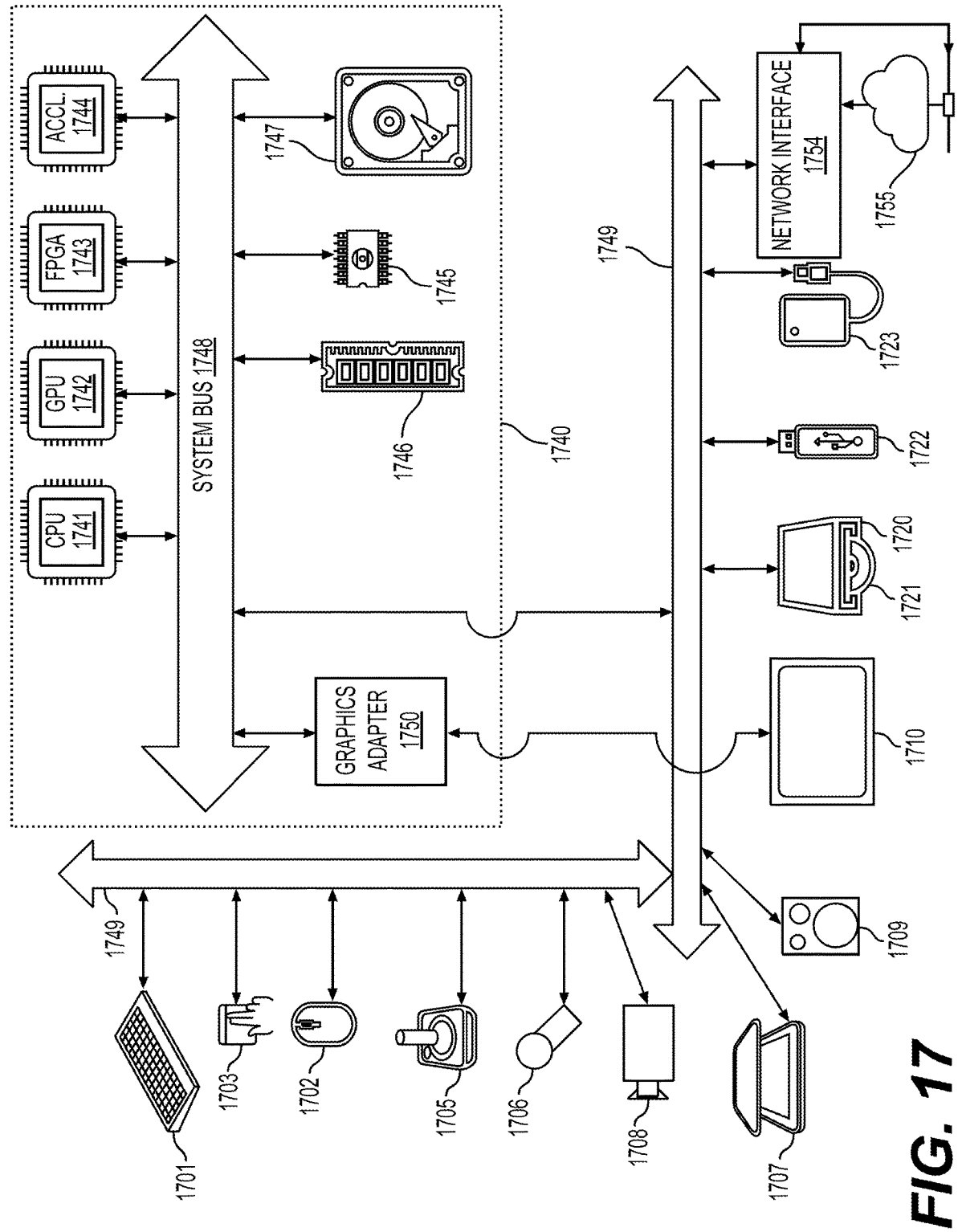
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photottraphic images obtain from a still image camera), video (such a two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, tbr example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

ASIC: Application-Specific Integrated Circuit
AVS: Audio Video Coding Standard
AVS: Audio Video Coding Standard
BMS: Benchmark Set
BT: Binary Tree
CANBus: Controller Area Network Bus
CD: Compact Disc
CfP: Call for Proposals
CPUs: Central Processing Units
CRT: Cathode Ray Tube
CTBs: Coding Tree Blocks
CTU: Coding Tree Unit
CU: Coding Unit
DVD: Digital Video Disc
EQT: Extended Quadtree
FPGA: Field Programmable Gate Areas
GOPs: Groups of Pictures
GPUs: Graphics Processing Units
GSM: Global System for Mobile communications
HDR: High Dynamic Range
HEVC: High Efficiency Video Coding
HRD: Hypothetical Reference Decoder
IC: Integrated Circuit
JEM: joint exploration model
JVET: Joint Video Exploration Team
JVET: Joint Video Exploration Team
LAN: Local Area Network
LCD: Liquid-Crystal Display
LTE: Long-Term Evolution
MV: Motion Vector
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SDR: standard dynamic range
SEI: Supplementary Enhancement Information
SNR: Signal Noise Ratio
SSD: solid-state drive
TT: ternary tree
TUs: Transform Units,
USB: Universal Serial Bus
VTM: VVC Test Model
VUI: Video Usability Information
VVC: Versatile Video Coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding at a video decoder, comprising:

receiving in a bitstream an enabling flag associated with a parent coding unit (CU) in a picture, the enabling flag indicating whether a direct split mode is enabled for partitioning the parent CU into a predefined set of child CUs without performing a recursive tree-structure-based partitioning;

in response to receiving the enabling flag indicating that the direct split mode is enabled for partitioning the parent CU into the predefined set of child CUs without performing the recursive tree-structure-based partitioning, receiving in the bitstream a syntax element associated with the parent CU indicating how the parent CU is partitioned into the predefined set of child CUs in the direct split mode without performing the recursive tree-structure-based partitioning, a number of the predefined set of child CUs resulting from the partition indicated by the syntax element being greater than 4; and processing the child CUs according to the indication of the syntax element to reconstruct the picture.

2. The method of claim 1, wherein at least two subdivisions need to be performed when the parent CU is partitioned using the recursive tree-structure-based partitioning in order to obtain the same set of child CUs.

3. The method of claim 1, wherein at least one of the child CUs has a size larger than a minimum allowed CU size for partitioning the parent CU and includes no syntax element to indicate whether the at least one of the child CUs is to be further subdivided.

4. The method of claim 1, wherein the recursive tree-structure-based partitioning is a recursive partitioning based on a binary tree structure, a ternary tree structure, a quadtree structure, an extended quadtree structure, or a combination of two or more of the binary tree structure, the ternary tree structure, the quadtree structure, or the extended quadtree structure.

5. The method of claim 1, wherein the parent CU is a coding tree unit (CTU) partitioned from the picture, or is partitioned from a CTU that is partitioned from the picture.

6. The method of claim 1, wherein the child CUs are CUs that are not further subdivided.

7. The method of claim 6, wherein no syntax element associated with each of the child CUs is transmitted in the bitstream for indicating whether each of the child CUs is further subdivided.

8. The method of claim 1, wherein at least one of the child CUs is associated with a syntax element indicating whether the at least one of the child CUs is further subdivided.

9. The method of claim 1, wherein the child CUs have a same shape and size.

10. The method of claim 1, wherein the child CUs have a square shape or a rectangular shape.

11. The method of claim 1, wherein the child CUs have a size of 8×8 samples.

12. The method of claim 1, wherein the child CUs have different shapes or sizes.

13. The method of claim 1, wherein the syntax element indicates a template describing how the parent CU is partitioned into the predefined set of child CUs.

14. A method of video encoding at a video encoder, comprising:

partitioning, with a direct split mode, a parent coding unit (CU) in a picture into a predefined set of child CUs without performing a recursive tree-structure-based partitioning; and processing the child CUs to generate a bitstream including:

an enabling flag associated with the parent CU that indicates the direct split mode is enabled for partitioning the parent CU into the predefined set of child CUs without performing the recursive tree-structure-based partitioning, and following signaling of the enabling flag that indicates the direct split mode is enabled for partitioning the parent CU into the predefined set of child CUs without performing the recursive tree-structure-based partitioning, a syntax element associated with the parent CU that indicates how the parent CU is partitioned into the set of child CUs in the direct split mode without performing the recursive tree-structure-based partitioning, a number of the predefined set of child CUs resulting from the partition being greater than 4.

15. An apparatus of video decoding, comprising circuitry configured to:

receive in a bitstream an enabling flag associated with a parent coding unit (CU) in a picture, the enabling flag indicating whether a direct split mode is enabled for partitioning the parent CU into a predefined set of child CUs without performing a recursive tree-structure-based partitioning;

in response to receiving the enabling flag indicating that the direct split mode is enabled for partitioning the parent CU into the predefined set of child CUs without performing the recursive tree-structure-based partitioning, receive in the bitstream a syntax element associated with the parent CU indicating how the parent CU is partitioned into the predefined set of child CUs in the direct split mode without performing the recursive tree-structure-based partitioning, a number of the predefined set of child CUs resulting from the partition indicated by the syntax element being greater than 4; and process the child CUs according to the indication of the syntax element to reconstruct the picture.

16. The method of claim 1, wherein the number of the predefined set of child CUs resulting from the partition indicated by the syntax element is equal to or greater than 8.

17. The method of claim 1, wherein the number of the predefined set of child CUs resulting from the partition indicated by the syntax element is equal to or greater than 16.

18. The method of claim 1, wherein the number of the predefined set of child CUs resulting from the partition indicated by the syntax element is equal to or greater than 32.

19. The method of claim 1, wherein in response to the direct split mode being disabled, determining that the parent CU is partitioned into child CUs by performing the recursive tree-structure-based partitioning.

20. The method of claim 14, further comprising:

selecting one of the recursive tree-structure-based partitioning and the direct split mode to partition the parent CU, the selection being based on a rate-distortion optimization based algorithm or a property of signals in the parent CU.

* * * * *